J. A. HILLERICH.
CENTERING DEVICE.
APPLICATION FILED JUNE 30, 1915.

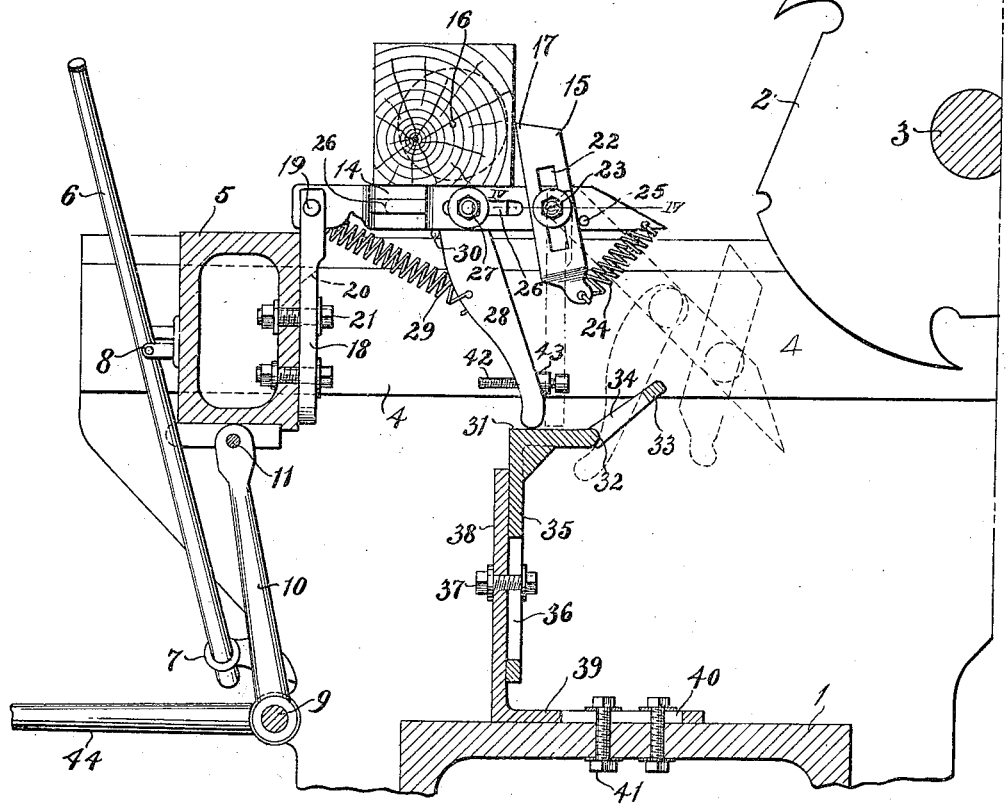

1,281,569.

Patented Oct. 15, 1918.
2 SHEETS—SHEET 2.

Witness:
Russell N. Low

Inventor
John A. Hillerich

By H N Low

Attorney

UNITED STATES PATENT OFFICE.

JOHN A. HILLERICH, OF LOUISVILLE, KENTUCKY.

CENTERING DEVICE.

1,281,569. Specification of Letters Patent. Patented Oct. 15, 1918.

Application filed June 30, 1915. Serial No. 37,360.

*To all whom it may concern:*

Be it known that I, JOHN A. HILLERICH, a citizen of the United States, residing at Louisville, in the county of Jefferson and State of Kentucky, have invented certain new and useful Improvements in Centering Devices, of which the following is a specification.

My invention relates to stock-centering devices to be used on lathes for turning base ball bats and other articles for which it is suitable. The object of the improvement is to quicken the operation of placing in the lathe the piece of wood or stock from which the bat is to be turned, and to do it accurately so that material is not lost or wasted by leaving a flat or unturned place on it, which arises from centering that part of the stock too near the axis of the lathe to be reached by the rotary cutters; the axis of the latter having a predetermined fixed relation to the nearest approach which the axis of the centered stock can make to the axis of the cutters, according to the desired diameter and shape of the bat. It will be understood that while the pieces of stock to be turned are or may be approximately square in cross section and are intended to be large enough in such dimensions to contain the desired form of bat, they vary more or less from the square shape and some of them are so small as only to contain the bat when they are very accurately centered, which, in such cases is a matter of judgment and time and requires a skilled workman. By the use of my invention the pieces of stock may be cut smaller, which is a saving, and cheaper labor may be employed, with the more rapid production of perfectly turned bats.

Such being the objects and general nature of the invention, it consists in the parts and combinations thereof hereinafter set forth and pointed out in the claims.

In order to make the invention more clearly understood I have shown in the accompanying drawings means for carrying it into practical effect, without limiting my improvements to the particular construction which, for the purpose of example, I have illustrated. In the said drawings—

Figure 1 is a transverse vertical section of a lathe, or portion of the same, having my improved centering means applied thereto.

Fig. 2 is a plan view of parts of the same, on a smaller scale.

Figure 3:
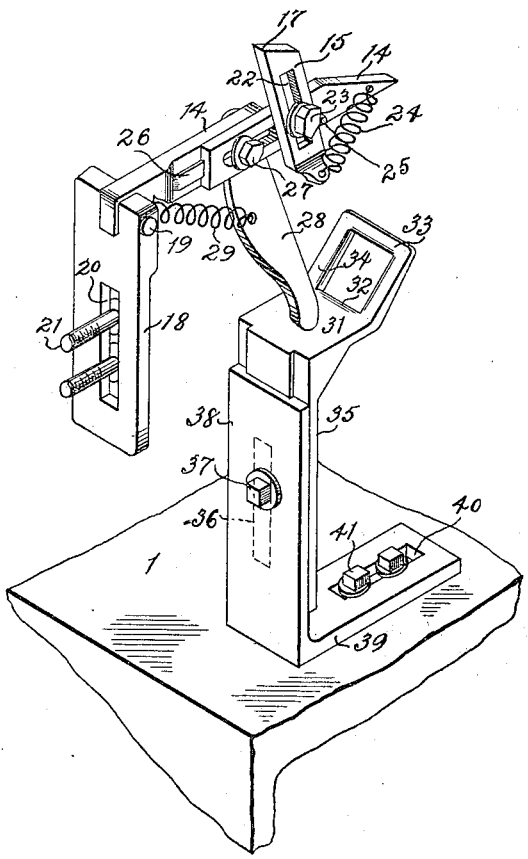
Fig. 3 is a perspective view of the centering device, looking diagonally from the front.
Figure 4:
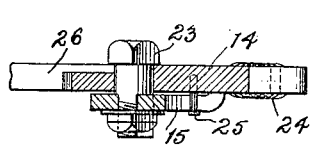
Fig. 4 is a horizontal section on line IV—IV of Fig. 1.
Figure 5:
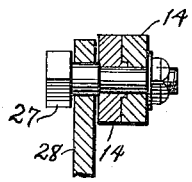
Fig. 5 is a vertical section on line V—V of Fig. 2.

Referring to the drawings, 1 is a fixed bed or table of the lathe, 2 the turning cutters and 3 the revolving cutter shaft on which the cutters are fixed, these and other parts of the lathe not forming a part of my invention and not requiring to be further illustrated. 4 indicates one of two horizontal arms forming fixed parts of the lathe frame, fitted to slide on which toward and from the cutters is a work-carrying slide 5. The latter is operated to carry the stock up to the cutters and to return the finished bat by a hand lever 6. This is pivoted to the main frame at 7 and extends upward and to the right across the front of the slide 5 to which it is pivoted at 8. A rock shaft 9 with its arms 10 pivoted to the slide at 11 aid in giving a parallel motion to the slide. The slide is controlled to stop at the proper points of its inward and outward movements, if desired, by adjustable stops of known character.

12 indicates the head stock and 13 the tail stock of the lathe (Fig. 2) and rotary movement is communicated to the head stock when the slide 5 is moved toward the cutters in a known manner, the head stock being stationary and non-revolving when the slide is drawn out, as in Fig. 1. The stocks 12 and 13 are connected and move with the slide.

The centering device is shown at A, comprising primarily a horizontal rest 14 and a nearly upright center arm 15. When the slide is drawn out in position for the piece to be turned to be applied to the head and tail stocks the rest 14 will be between said stocks and just a little farther below the turning center 16 than the radius of the largest part of the bat, and the bearing point 17 of the arm 15 will be the same distance, both from the rest 14 and from the center 16. The point 17 is thus in the same horizontal plane as the center 16. The said rest and center arm being in the positions just described the piece of wood or stock to be turned, shown at B, is laid on the rest and caused to engage up against the point 17 of the arm. The point of the tail stock is then thrown in, commonly by a weighted lever, to engage one end of the wood B and press its other end against the head stock. The wood is now in accurate position to be turned, and will produce a perfect bat unless the piece is too small, and the liability of its proving too small is reduced to the minimum because it is so centered that a very small thickness is turned off from the bottom and inner side, and on the top and outer side the piece will be practically sure to contain the bat. Smaller pieces will be thus turned perfectly and not wasted than with ordinary means of centering. In order that the centering device may not be in the way of the inward movement of the slide 5, and may be controlled by the movements of the latter, the said parts 14 and 15 are connected with the slide, as later explained, and so as to be moved out of the way of the cutters as the slide advances.

I may here state that only one of the centering devices A is illustrated, and this is sufficient where one end of the object to be produced is larger than the other end. In such case, for instance in turning a bat, the centering device is arranged near that end of the wood where said larger end will be turned out, this being the part of the wood which requires to be accurately centered. There being so much more thickness of wood at the other end where the handle is turned out, that end can be sufficiently well centered by eye on the lathe stock. But it will be understood that I may employ two centering devices, one near each lathe stock, for turning bats; and in turning articles which are of approximately the same diameter from end to end two of such centering devices should be employed.

18 is a vertically adjustable plate to which the outer end of the rest 14 is pivoted at 19, said plate having a vertical slot 20 through which pass bolts 21 into the slide 5. The last mentioned construction enables the rest 14 to be lowered if an article of greater diameter is to be turned. The arm 15 is formed with a slot 22 through which passes a shouldered bolt 23 into the inner end of the rest 14, whereby the arm is held from sliding on the slot, except when it is being adjusted up or down, but the arm 15 may turn relative to the rest. By this adjustment of the arm 15 it is accommodated to any adjustment of the rest 14 and so that its point 17 may always be kept level with the center 16. This engagement of the arm 15 with the wood by a small surface or point prevents the wood from being inaccurately centered by reason of any shavings or dirt that might accumulate on the outer face of the arm. 24 is a spring connecting the ends of the arm and rest and acting to press the point 17 toward the center 16, this movement being limited by a stop pin 25 fixed on the inner part of the rest. The inner end of the rest 14 is beveled off on its upper side to more readily avoid the cutters on the inward movement of the slide and to enable the centering device to be depressed by the rotating wood if the latter be withdrawn before it has been turned. The rest 14 is formed in two parts, both slotted, as shown at 26, and connected by an adjusting bolt 27, by which adjustment the length of the arm and the distance of the point 17 from the center 16 may be regulated. On one end of the bolt 27 is pivoted a leg 28 which is connected by a spring 29 with the pivot bolt 19. This spring pulls the leg outward, and this movement is limited by a pin 30 fixed on the rest 14. The lower end of the leg 28 is arranged to rest and slide on a table 31, which is horizontal and is of sufficient extent to keep the rest 14 at the proper distance below the point 16 whenever the slide 5 is in its outermost position and also in case the slide be not entirely drawn out or be jarred a little inward from its outermost position by the vibrations of the machine. The wood may be thus accurately centered at different positions of the centering device when the latter is near its outermost position. As the centering device is moved inward toward the cutters the lower end of the leg 28 passes down over the inner lip 32 of the table 31, being pulled down by gravity and by the spring 29, and this draws the whole centering device downward and outward away from the wood and away from the cutters, leaving the latter free to operate on the wood. This withdrawn position of the centering device is indicated by dotted lines in Fig. 1. 33 is a transverse bar somewhat elevated above the table 31 and attached to or formed with the latter by arms 34, the function of the bar 33 being to force down the leg 28 if the spring 29 should not act properly. The table 31 is provided with a depending arm 35 which is slotted at 36. Through this slot passes a bolt 37 which is screwed into a vertical bracket arm 38. This bracket is provided with a horizontal arm 39 formed with a slot 40, and through this slot pass bolts 41 which adjustably secure the bracket to the frame table 1. By the described adjustable connections the height and position of the table 31 may be regulated.

It is sometimes necessary to pull back the stock before it is turned and as it is revolving. Its momentum usually keeps up such revolution for a short time and the stock may come in contact with the inner end of the rest or upper end of the arm 15. In such case it will depress the rest and will throw the upper end of the arm inward and downward out of the way without causing any breakage, the arm 15 turning on its pivot 23 and the spring 24 yielding for this purpose. But immediately afterward the arm will be restored by the spring to proper and accurate position. The same movements of the arm 15 do or may occur as it is depressed and the wood passes over it to the cutters.

The head stock and the cutter shaft turn in the same directions. There are sufficient cutters 2 arranged along the shaft 3 to turn the bat for its whole length.

After the bat has been turned the lever 6 is pulled out, bringing the head and tail stocks to their original outermost position, or nearly so, the lip 32 forcing up the leg 28 and the whole centering device to operative centering position. The wood can be centered accurately provided the bottom end of the leg 28 is resting anywhere on the table 31.

The device is especially efficient and saving of time and material when stock is not sawed square or is otherwise irregular. The adjustments are such that the stock begins to revolve just as or after the end of the leg 28 begins to pass down over the table-lip 32.

42 indicates one of the stops which may be employed to arrest the movement of the work-carrying slide 5 toward the cutters, this stop being in the form of a set screw horizontally adjustable in an ear 43 fixed on the main frame. The tail stock 13 is adjustable in the usual manner toward and from the head stock 12 to accommodate different lengths of work. 44 is a horizontal handle for moving the slide 5. The main movement of the slide may be accomplished by this handle, and after the work is near the cutters the handle 6 may be pressed in gradually until the turning operation has been finished.

In order to adjust the centering device for turning out bats of say one-quarter inch greater diameter, it is only necessary to proceed as follows: Loosen the bolt 27 and extend the inner part of the rest 14 toward the cutters one-eighth of an inch. This carries the arm 15 one-eighth of an inch farther away from the center. Raise the arm 15 one-eighth of an inch on its bolt 23; lower the plate 18 one-eighth of an inch and lower the table 31 one-eighth of an inch by loosening the bolt 27. All sizes of stock may be accurately centered by making similar or reverse adjustments, according to size.

What I claim is—

1. A centering device for lathes, comprising a horizontal rest for the under side of the stock, and an upright yielding and spring-controlled arm having a point which bears against the side of the stock at the level of the lathe center and at a distance from said center equal to substantially the radius of the article when turned, whereby the excess of the stock is left at the top and at the side opposite to the said point.

2. A centering device for lathes, consisting of the combination, with work holding and rotating means, of an automatically disengageable rest for the under side of the work to be turned, arranged at a distance below the lathe center substantially equal to the radius of the finished work, and a laterally positioning device arranged to make a point or link contact merely at one side of the work at the level of and at a distance from the lathe center substantially equal to said radius.

3. A movable centering device for lathes combined with a cutter and lathe centers movable toward the cutter, said centering device being connected to move with the lathe centers and having means for engaging the stock on the bottom and at a point on the side which point is level with the axis of turning, combined with means for holding the same in centering position when the lathe centers are pulled out, and means whereby it is automatically turned, on an axis parallel with the axis of the stock, away from the stock and clear of the cutters when the stock is presented to the cutters.

4. The combination of a cutter, head and tail stocks movable toward the cutter, a centering device arranged between said head and tail stocks and pivotally mounted to move bodily with the same and to swing toward the cutter and away from the axis of rotation of said stocks, and having means for engaging the material at its under side and at its side toward the cutter, said engaging means being at a distance from the axis of rotation substantially equal to the radius of the article to be turned, and means whereby the centering device is swung automatically on its pivot when the material is presented to the cutter and is automatically restored to centering position when the head and tail stocks are moved back from the cutter.

5. The combination of a cutter, a lathe slide carrying the rotatable supports for the work-piece, a centering device mounted on an axis parallel with the axis of the work-piece and downwardly swingable thereon toward the cutter to clear the stock and the cutters when the slide is advanced, and fixed means operating automatically to return the centering device to operative position when the slide is withdrawn, said means acting to hold said device in centering position at different partly withdrawn positions of the slide.

6. The combination of a lathe slide, a horizontal rest pivoted thereto, an upright centering arm movably pivoted on said rest, a stop and spring controlling said arm, a supporting and guiding leg pivotally connected with the rest, a stop and spring controlling said leg, and a guide for the leg parallel with the plane of movement of the slide.

7. The combination of a lathe slide, a horizontal rest consisting of outer and inner connected and relatively adjustable parts, a vertically adjustable pivot connection between said outer part and the slide, an upright centering arm pivoted and adjustable on said inner part and having a stop and spring controlling the same, a supporting and guiding leg pivotally connected with the rest, a stop and spring controlling said leg, and a guide for the leg holding the rest and arm in centering position.

In testimony whereof I affix my signature hereto.

JOHN A. HILLERICH.

Copies of this patent may be obtained for five cents each, by addressing the "Commissioner of Patents, Washington, D. C."